Dec. 14, 1965     A. O. FISCHER     3,222,849

SHORT CYCLE REGENERATION

Filed March 29, 1963     3 Sheets-Sheet 1

INVENTOR
ALFRED O. FISCHER

BY *Alexander & Dowell*
ATTORNEY

INVENTOR
ALFRED O. FISCHER

BY Alexander & Dowell
ATTORNEY

United States Patent Office 3,222,849
Patented Dec. 14, 1965

3,222,849
SHORT CYCLE REGENERATION
Alfred O. Fischer, Shreveport, La., assignor to American Machine & Foundry Co., a corporation of New Jersey
Filed Mar. 29, 1963, Ser. No. 269,070
18 Claims. (Cl. 55—163)

This invention relates to short-cycle adsorption gas-processing systems for removing water and heavier hydrocarbon components from mineral gas streams, and more particularly relates to improvements in split-stream regeneration systems wherein multiple adsorption towers are cyclically switched for the sake of converting a process which is inherently a batch process into a substantially continuous process, the present invention being described in terms of a practical system for controlling, according to exit temperatures, three adsorption towers so that there is always one tower being regenerated, another regenerated tower being cooled, and a third tower performing main-stream adsorption, and the three towers being cycled automatically at an optimum rate.

Split stream regeneration systems of this general type are in common use, and usually are operated by controls which perform the switching of the above three tower cycles according to a predetermined clock-timed sequence. Alternatively, some prior art systems are controlled in such a manner as to maintain a fixed flow of regeneration gas. In the latter type the pressure drop across the whole system which is required to force flow of the regeneration stream is provided by one or several flow control valves located between the point where the regeneration stream is split off of the main stream and a point where it rejoins it just ahead of the main stream adsorption tower. The rate of flow of the regeneration stream, as controlled by the flow control valves, is maintained by intelligence taken from an orifice in the regeneration path.

In both of these prior art systems, the control means are usually adjusted so as to make the system operate safely under the least favorable conditions of service which are expected and, although it is intended that a degree of manual control will be exercised in order to make the system function more efficiently, this manual control seldom maintains a system in efficient performance on a continuous basis. The present invention is intended to provide a system of automatic control capable of operating the various system units at their maximum composite efficiency by taking full advantage of their individual more-efficient operation rates to cycle the three towers as rapidly as possible to provide optimum recovery.

It is a principal object of this invention to provide an automatic control which functions to maintain the sequential tower switching rate as high as possible consistent with permitting each component of the system to complete its necessary function prior to being switched.

The present system further includes a sensing and actuating means which measures the outlet temperatures of various units within the system, including a heater for the regeneration gas stream and a condenser for recovering components picked up by the regeneration stream, and said sensing means waiting until the last of these units and each of the towers has completed its function, as determined by its gas-exit temperature, and then actuating main flow control means to shift the various adsorption towers each to the next sequential function in the overall cycle.

The adsorbent in each tower is the material which actually removes the water and heavier hydrocarbons from the main gas stream, and therefore the most efficient use of this adsorbent will provide the most efficient use of the entire system. Since the rate of adsorption rapidly decreases when approaching saturation, and since the regeneration of the adsorbent and its cooling take longer than the adsorption cycle itself, the greatest efficiency is realized by the fastest possible cycling of the three towers consistent with the capabilities of the various units of the system to desorb and cool the towers being regenerated without exceeding the maximum allowable pressure drop across the system. Fundamentally, the present system controls the flow of regeneration gas split from the main stream, and the frequency of tower switching. The control of these variables requires consideration of the allowable differential pressure across the plant, the capability of the split stream heater to quickly raise the temperature of the gas to the maximum level which can be used with the adsorbent employed, and the capability of the condenser to lower the temperature of the enriched gas stream to cause condensation of the enrichments.

In the prior art systems in which the regeneration flow rate is set as a constant and is maintained by a flow controller sensing the rate of flow in the regeneration path, there are numerous disadvantages, because: (1) The system does not allow for changing conditions within a single cycle. During the early part of a cycle on a three-tower unit, for example, the gas going to the heater is already partly preheated, and that going to the condenser is cool. Consequently, the regeneration rate should be high at this time to tax these components to the utmost and take full advantage of these favorable conditions. Later in the cycle, when the reversed conditions tend to exist a much lesser rate of flow is all that can be used while still maintaining optimum exit temperatures, even with the heater and condenser performing at their maximum capabilities. Therefore in such a prior art system a fixed flow rate would have to be set to match these worst conditions where no automatic flexibility is provided. (2) The system does not allow for atmospheric changes, day-to-night, or season-to-season. If adjustment is to be made to take advantage of weather or climatic changes, such changes must be anticipated by man and manually set. (3) The system does not allow for changes in throughput. Again, this can be taken into account with manual settings of a fixed regeneration rate. But because the plant operator is frequently not the pipeline operator he does not anticipate throughput changes. Moreover, because of simple lethargy, the usual tendency is to "set it and forget it."

The present novel control operates the units of the system at the maximum efficiency of which they are capable, and then cycles the flow through the plural towers as rapidly as is consistent with having each tower complete its assigned function, so that the towers are never permitted to continue their present functions beyond the first moment when all of the towers are ready for switching to a new function in the sequential cycle, and in the meanwhile adjustment is automatically made for varying flow rates and ambient conditions.

Another object of this invention is to provide a novel temperature sensing and flow control system in which exit temperatures from major units are sensed, and in which resulting analog signals are cascaded into the flow control means in such a manner that regeneration is maintained at optimum rates, and means is provided to determine that all of the sensed temperatures are satisfactory before tower switching can occur so that the last unit to reach the required temperature is the one which actually initiates the tower switching, and is referred to hereinafter as being the governing unit. The present system also provides a differential pressure control which is capable of overriding the said governing unit's signal in order to prevent possible closing of the flow control valves to such an extent that the maximum permissable differential pressure drop is exceeded. Thus, the present system operates with a regeneration rate automatically adjustable at all times to satisfy whichever of the units of the system is governing, and differs from the prior art which is merely adjusted to take care of the anticipated least favorable conditions under which the system will have to operate.

The ultimate goal of this invention is the shortest possible time in each phase of the cycle, consistent with given equipment. The quickest cycling results in the greatest quantity of regenerated adsorbent being exposed to the gas stream. The key to this goal is the maximum utilization of the heater and the condenser to maximize the regeneration rate, as well as the most rapid switching of towers as determined by sensing temperatures indicating when these units have reached the conclusion of their assigned functions. The saving of time in the regeneration cycle, of course, does no good unless the switching cycle is then advanced to take advantage thereof, and it is this advance in the cycling which saves valuable time as compared with a system operating on a fixed time cycle.

The adsorbent is selective in its action. When a gas stream containing a high percentage of methane, with small percentages of heavier hydrocarbons, is admitted to an adsorbent bed, that bed is rapidly saturated with methane. As the exposure continues, because of the selective nature of the adsorbent, the adsorbed methane is driven off by an accumulation of ethane. The ethane is then driven off by an accumulation of propane, and the propane is displaced by an accumulation of butane with still longer exposure, and so on. Thus, the molal quantity which can accumulate on a bed is relatively constant regardless of the length of the time the bed has been exposed. Conversely, the removal of the greatest quantity of material from the gas stream will require the greatest number of cycles of the towers per interval of time.

Although the present invention is described in terms of an embodiment having three adsorbing towers, it is to be understood that a greater or lesser number of towers can be used and their efficiency improved by the present novel system.

Other objects and advantages of the invention will become apparent during the following discussion of the drawings, wherein.

Figure 1:
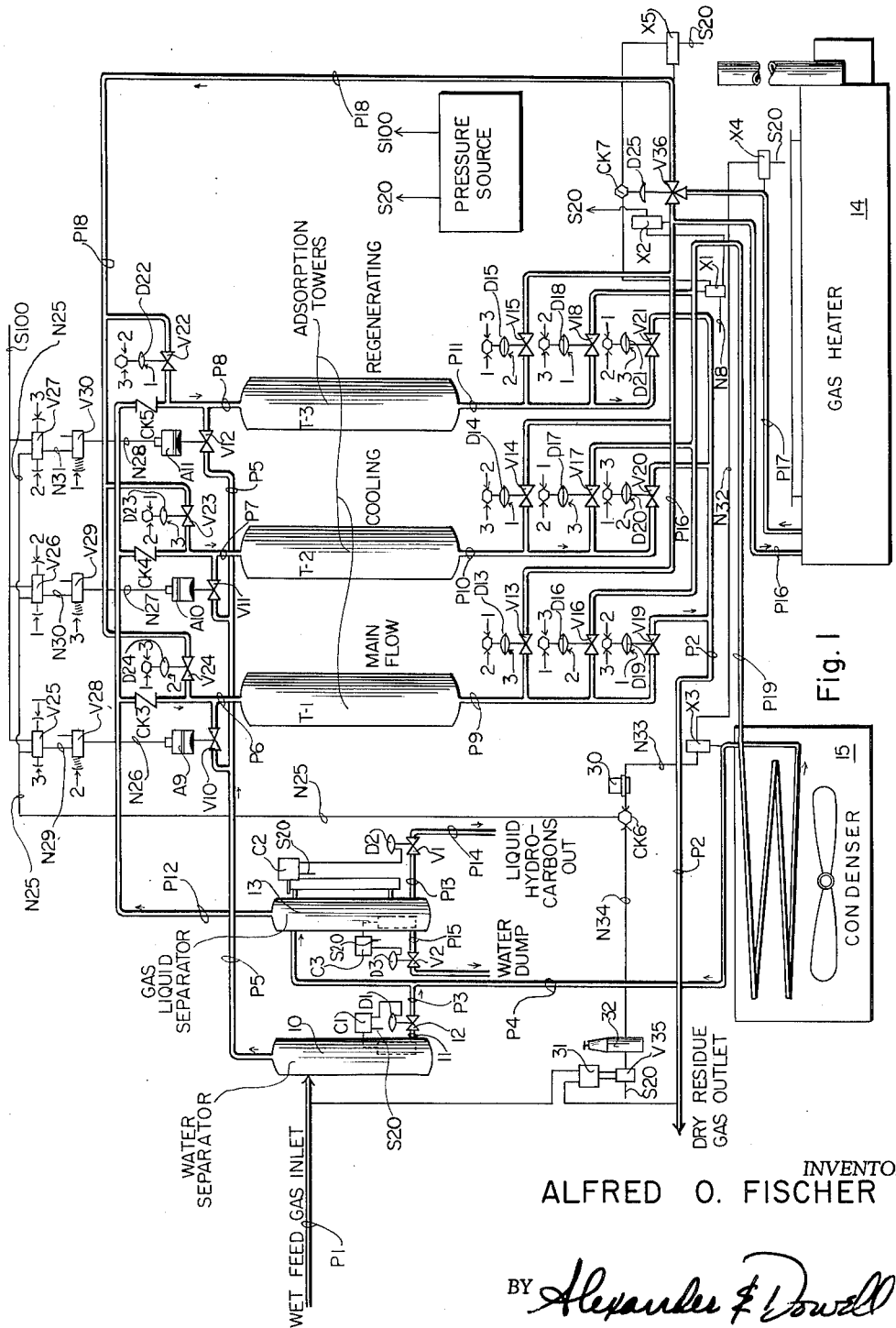
FIG. 1 is a flow diagram of a practical three-tower regenerative system according to the present invention.

Referring now to the drawings, and particularly to FIG. 1, the wet feed gas is introduced into the system in the upper left-hand corner of the figure at pipe P1, and the dried residue gas leaves the system through the pipe P2 located therebelow. Suitable gauges measuring pressure P and temperature T are distributed throughout the system. The wet gas entering the system first passes through a conventional liquid separator 10 which has a liquid drain 11 at its lower end controlled by a valve 12 which is open when the liquid within the separator reaches a predetermined height as measured by a controller C1.

The entire control circuit of the present system is pneumatic in nature, and this pneumatic circuit takes its operating pressure from one of two pressure sources, one of them labeled S20 because it is a 20 pound source and the other being labeled S100 because it is a 100 pound source. The pneumatic fluid may be compressed air, or other standard propellant, or may be taken from gas being treated in the system. The controller C1 serves to modulate the gas stream introduced by the source S20 and sends it to a diaphragm actuator D1 which serves to open and close the drain valve 12 in a manner well known per se. The liquid drain from the bottom of the separator 10 passes through the pipe P3 and joins the pipe P4 which enters a second separator 13 which, along with other components to be discussed later, separates a two-phase input arriving through pipe P4 respectively into gas and liquid components. At the top of the separator 10, the main flow of gas travels to the right in pipe P5 toward three adsorption towers T1, T2, and T3. This flow from the pipe P5 is sequentially controlled by a system of valves located above the towers which will be described below in connection with the control system. In general, these valves sequentially control the flow of gas so that one tower is performing main-flow adsorption while another tower is being regenerated, and a third tower is being cooled.

The inlets to the towers T1, T2, and T3, respectively, located at the tops thereof, comprise the pipes P6, P7, and P8, and the outlets from the towers respectively comprise the pipes P9, P10 and P11, and these three outlets are connected with other series of valves V13 through V21 located below the towers which route the departing gases from whichever tower is performing main-flow adsorption to dry gas outlet pipe P2, and route the gases from whichever tower is being cooled to a gas heater 14, from which heater the heated gases are passed through whichever tower is being regenerated. The gas outlet at the bottom of the tower which is being regenerated is then routed to a condenser 15 where it is chilled and passed by way of the pipe P4 into the gas-liquid separator 13. There are three discharges from this separator. The separated gas in the separator 13 is prevented from building up excessive pressure by a series of check valves CK3, CK4 and CK5 coupling the exit pipe P12 back into the mainflow adsorption tower. Liquid hydrocarbons from the gas-liquid separator 13 are discharged through the pipe P13 by way of a control valve V1 and then are discharged through the pipe P14 into the suitable storage. The water discharge from the separator 13 is through the pipe P15 through the valve V2. As in the case of the liquid-control means C1 of the water separator 10, the separation at proper levels of the liquid hydrocarbons and the water is controlled by a controller C2, in the case of the liquid hydrocarbon which furnishes a signal to diaphragm actuator D2 which then operates the valve V1, and by control C3 which also issues a pneumatic signal to a diaphragm actuator D3.

There are two different pneumatic control circuits in the present system, one of these is the sequential tower-switching control circuit, and the other is the regeneration-rate control circuit. These two circuits cooperate with each other, although they can be considered separately. In general, the tower-switching sequence control circuit measures the exit temperatures from whichever tower is being regenerated by an exit temperature controller X1, and from whichever tower is being cooled by an exit temperature controller X2, and at the moment when the exit temperatures of both of these towers reaches predetermined values, the sequential switching control circuit (shown in FIG. 2) operates to deliver one of three header signals 1, 2, or 3, and these latter signals control the large number of valves shown at the upper and lower ends of the three adsorption towers T1, T2 and T3 to advance the functions of these towers to the next sequential condition functions in the cycle.

The regeneration rate control circuit takes its intelligence from two other temperature controllers labeled X3 and X4 in FIG. 1, wherein X3 measures the exit temperature from the condenser 15 and X4 measures the exit temperature from the gas heater 14. The pneumatic signals from the temperature controllers X3 and X4 are combined in a manner to be hereinafter discussed in greater detail to provide a composite control signal which automatically controls the rate of flow of regeneration gas through the towers in such a manner as to provide optimum use of the adsorbent.

The sequential tower switching control

Figure 2:
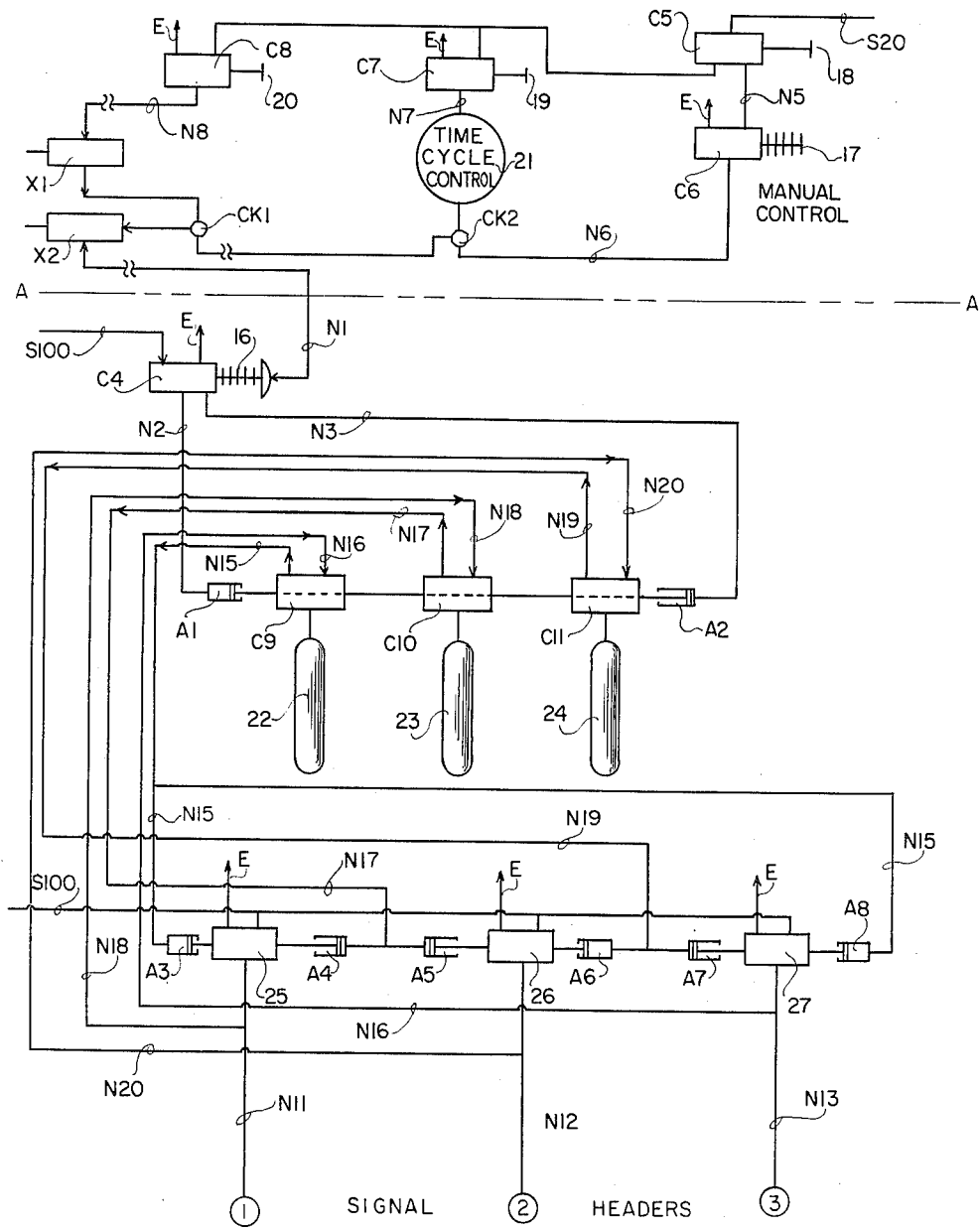
FIG. 2 is a diagram of a sequential pneumatic tower switching circuit.

This switching control circuit is shown in FIG. 2 which is connected with FIG. 1 in the following manner: The control circuit shown in FIG. 2 has three outputs labeled signal header 1, signal header 2, and signal header 3. These three outputs are connected to a large number of different inputs labeled 1, 2, and 3 at various control valve actuators shown in FIG. 1, mostly located at the upper and lower ends of the adsorption towers. There are four other connections which couple FIG. 2 with FIG. 1, namely two pneumatic supply lines labeled S20 and S100, and the two temperature controllers which appear in both figures, and in each are labeled X1 and X2 respectively.

There are three different provisions illustrated for controlling the switching of the present gas processing system, these provisions being shown above the line A—A in FIG. 2 and including Manual, Time-Control, and Temperature-Control provisions. It should be noted that the entire output from the circuit above the line A—A comprises in pneumatic line N1 a single on-off signal which controls the position of a sliding control valve C4 by operating its plunger located on the right side thereof, which plunger is spring loaded by a spring 16 so that the control valve C4 in the absence of pressure in the line N1 is normally maintained in a position which will connect the supply source S100 to the penumatic line N2, and which vents the line N3 by way of exit pipe E. On the other hand, when a pneumatic signal is present in line N1, the plunger is moved to the left compressing the spring 16 and causing the pressure source S100 to be connected to the line N3, and the line N2 to be vented at E.

Referring again to the circuit located above the line A—A, a 20 pound supply is introduced by source S20 into a control valve C5. When the plunger 18 is pulled out at this valve, the 20 pound supply is introduced into a manual control valve C6 which is spring loaded in such a direction as to block the pneumatic flow from the line N5 to the line N6. On the other hand, when the plunger 17 is manually pressed in a direction to compress the loading spring, pressure is passed from the line N5 to the line N6 and through two manifolding check valves CK1 and CK2, and through the temperature controller X2 to the line N1. Thus, when the plunger 18 of the control valve C5 is pulled out, the system is prepared for manual operation. Each time the plunger 17 is pressed, the cycle is advanced by one sequential position and the functions of the three adsorption towers are thereby switched. However, this manual signal from line N6 is passed on its way to line N1 through the temperature controller X2 which measures the output temperature of the cooling tower and prevents switching of the cycles until this exit temperature is low enough to permit switching of the main flow thereinto. In other words, control is manual, but only after each cycle has reached a satisfactory stage.

If the plunger 18 is pushed in on the valve C5 the supply source S20 is then connected to two other control valves C7 and C8. These control valves also have plungers labeled 19 and 20. If the plunger 19 is pushed in, no pressure passes through the valve C7, but if it is pulled out, the line N7 is pressurized and a conventional time cycle controller 21 assumes control of the cycle subject, however, to the temperature controller X2. This controller 21 comprises a clock-timed valve, which at spaced intervals will pass a pneumatic pulse from the supply source S20 to the line N1. These manual and time-clock controlled features appear in one form or another in most prior-art systems.

If the plunger 19 is pushed in and the plunger 20 is pulled out, the line N8 will then be pressurized, and in this position, the cycle of the system will be automatically controlled in a novel way by the temperature controllers X1 and X2. When the tower being cooled has an exit temperature as measured by X2 below the maximum tolerable temperature, as preset, and when at the same time the tower being regenerated has an exit temperature as measured by X1 above a certain preset minimum, then a signal will be passed from the line N8 through the controller X1, through the check valve CK1 and through the controller X2 and into the line N1, this signal shifting the control valve from its normal position.

Referring now to the circuitry located below the line A—A in FIG. 2, it will be noted that there are only two input conditions to this circuitry, one of them comprising the 100 pound supply source S100 and the other comprising the control line N1 which is normally not pressurized, but which delivers a pneumatic pulse each time the system is to be cycled to the next sequential condition.

This circuitry located below the line A—A comprises a sequencing device which, each time it is pulsed by the line N1, delivers output from a different one of the three header signal lines N11, N12, and N13. This circuit includes three slide valves C9, C10, and C11, each of which includes an outer housing with three ports and a slider (not shown) which connects the lowermost port with one of the upper ports depending upon which position the slider is occupying. All three of the sliders are mechanically linked together for unitary motion, and the common mechanical linkage is connected at one end with a piston actuator A1 and at the other end with a piston actautor A2. When the line N2 is pressurized, as is normally the case, the actuator A1 drives all three slide valves to the right, thereby connecting the lines N16, N18 and N20, respectively, with the gas storage bottles 22, 23, and 24. On the other hand, when the line N3 is pressurized the valve sliders are all moved to the left thereby connecting the lines N15, N17 and N19, respectively, with the bottles 22, 23, and 24. These lines N15 through N20 inclusive extend down to another row of valves labeled 25, 26, and 27 of a similar type, in which a housing includes three ports and an internal slider mechanism connects the lowermost port N11, N12 or N13 with one of the two uppermost ports. In the left-hand position of each of the valve sliders, the lines N11, N12, and N13 are vented through the Exit E and in the right-hand position the lines N11, N12 and N13 are connected with the 100 pound supply line S100. The three sliders in this group of valves are not mechanically ganged together but are each independently slidable. A group of piston actuators A3, A4, A5, A6, A7 and A8 are respectively connected with the lines N15, N17, N19, and in such a manner that at any particular moment only one of the valves 25, 26, or 27 passes pressure to a header 1, 2, or 3, via lines N11, N12 and N13, and the other two valves vent their headers at E. If the pneumatic source is compressed air, the exits E can be vented directly to the atmosphere, but if the pressure is gas pressure, the exhaust must be manifolded and returned to the pipeline.

This sequential switching control circuit operates as follows. Since one of the signal headers at line N11, N12, or N13 is always pressurized at any particular stable instant, asume for the sake of discussion that the header number 1 is pressurized at line N11, and therefore pressure appears in the lines N11, and N18, the latter line being connected to control valve C10. At the time when the header number 1 was pressurized during a proceeding control pulse on line N1 appearing at the valve C4, the internal slider mechanism in valve C10 connected the line N18 with the bottle 23, and therefore 100 pounds of pressure was applied to this bottle from the source S100 through the valve 25 and into the line N11 and from there into line N18 and through the valve C10 and into the bottle 23. Since two of the valves 25, 26, or 27 at any particular moment are vented through their left-hand ports, the other two header lines N12, and N13 must at that instant have been venting the bottles 22 and 24 respectively through lines N16 and N20. Thus, only one of the bottles 22, 23 or 24 is pressurized at any particular time and serves as a memory device, it having been assumed as a starting point that bottle 23 is pressurized at the present moment and the system remains quiescent as long as there is no signal on line N1 so that the spring 16 holds the valve C4 in its right-hand position with the line N3 vented.

When the next signal arrives on line N1 it serves the purpose of stepping the sequential circuit to pressurize a different signal header by moving the slider mechanism in valve C4 to the left against the action of the spring 16, and placing pressure from line S100 on line N3, thereby driving the piston actuator A2 and the ganged sliders in the valves C9, C10 and C11 leftwardly and connecting the bottles 22, 23, 24 respectively with the lines N15, N17 and N19. Remembering that the bottles 22 and 24 have been vented and that bottle 23 is pressurized, the pressure within this bottle is thereby connected with the line N17 so as to apply pressure to the piston actuators A4 and A5, whereby the slider in valve 25 is moved to the left venting signal header 1 and the slider in valve 26 is moved to the right pressurizing signal header 2. Valve 27 is unchanged and remains in vented position during this cycle. When signal header 2 is pressurized because line N12 becomes pressurized, pressure in connected line N20 passes into the bottle 24 as soon as the valve 24 is released and the ganged sliders in valves C9, C10, and C11 are released. Now bottle 24 is the only one containing a charge. Bottles 22 and 23 are vented through the lines N16 and N18.

The system remains quiescent until another signal appears at line N1 causing the piston actuator A2 and the ganged sliders to move to the left and connect the bottle 24 with the line N19, pressurizing the piston actuators A6 and A7 to move to new positions driving the slider in valve 26 to the left and the slider in valve 27 to the right. In this position the lines N12 and N20 are vented, thereby venting the bottle 24, and the lines N13 and N16 are pressurized from the source S100 thereby pressurizing the bottle 22. The bottle 23 remains vented. On the next pulse appearing in the line N1 the ganged sliders in valves C9, C10, and C11 move to the left momentarily thereby connecting the pressure within the bottle 22 to the line N15, thereby causing the piston actuator A3 to drive the slider in valve 25 to the right and causing the piston actuator A8 to drive the slider in the valve 27 to the left. In this position, signal header 3 and bottle 22 are vented and signal header 1 is again connected to line S100 to pressurize line 18 and bottle 23. In this manner it can be seen that a different one of the signal headers labeled 1, 2, and 3 becomes pressurized each time a new pulse is applied to line N1, and the other two signal headers are vented. These signal headers 1, 2, and 3, are connected to the plurality of valves appearing in FIG. 1 immediately above and below the adsorption towers T1, T2 and T3 and controlling and the selective flow of gas therethrough.

Considering now the system of valves which control the flow of gas through the adsorption towers in FIG. 1, the main flow of gas approaches the adsorption towers in the pipe P5 and is introduced into one of the adsorption towers by one of the pipes P6, P7, or P8 depending upon the position of the various control valves V10, V11 and V12. Assume for the sake of discussion that tower T1 is carrying the main flow of gas, that tower T2 is being cooled and that tower T3 is being regenerated. In this case, a piston actuator A9 shown with its piston in an intermediate position modulates the rate of flow of the main gas stream through tower T1 and thereby adjusts the pressure drop across the system in such a way as to control the rate of flow of the regenerative gas stream as will be discussed hereinafter. Piston actuator A10 is shown with its piston in the wide open position meaning that valve V11 is wide open permitting the rapid flow of cooling gas through the tower T2. The piston actuator A11 is shown in closed position meaning that there is no flow through valve V12 into the tower T3 from the pipe P5. At the bottom of the three towers, the valve V19 is open, delivering treated gas to the dry residue gas outlet line P2. At the bottom of tower T2, valve V14 is open delivering the flow of cooling gas, which has been preheated while cooling tower T2, through the pipe P16 to the heater 14 to be further heated and then delivered by the pipes P17 and P18 to the top of tower T3 through a valve V22 controlled by a diaphragm actuator D22. This heated gas passes downwardly through the tower T3 regenerating it, and recovering components of the inlet gas stream by desorbing them from the adsorption agent in the tower. This rich gas stream passing downwardly through the valve V18 into the pipe P19 and into the condenser 15. After being cooled in the condenser, a dual-phase stream passes upwardly through the line P4 into the gas-liquid separator 13 which recovers water, liquid hydrocarbons, and gaseous components which are again introduced into whichever one of the adsorption towers is performing main flow via the check valves CK3, CK4, and CK5.

Recalling that any one of the header signals 1, 2, or 3 will be energized at any particular time, and the other two will be vented, the particular example of valve positions just assumed with respect to FIG. 1 occurs when header 1 is pressurized and the other two headers are vented. In this position, diaphragm actuators D19, D14 and D18 are opened so as to open the valves V19, V14, and V18, and the other valves all remain closed in the lower group of valves. In the upper group of valves diaphragm actuator D22 is operated by the number 1 header signal to open valves V22 but valves V23 and V24 remain closed.

In the lower group of valves beneath towers T1, T2 and T3, if header 2 were pressurized and headers 1 and 3 were vented, then diaphragm actuators D16, D20 and D15 would open valves V16, V20 and V15, in which case the tower T1 would be regenerating, the tower T2 would be on main-flow and tower T3 would be cooling.

On the other hand, if header 3 were pressurized, diaphragm actuators D13, D17 and D21 would be pressurized opening valves V13, V17 and V21, in which condition tower T1 would be cooling, tower T2 would be regenerating and tower T3 would be on main-flow.

The small hexagons above the diaphragm actuators comprise check valves venting the upper side of each diaphragm to the signal headers which are unpressurized at the time when the lower side of the corresponding diaphragm is pressurized, and connecting pressure to positively hold the diaphragm down which have not been pressurized from below.

In order to understand the operation of the upper piston actuators A9, A10 and A11, the pilot valve arrangement at the top of the drawings must now be considered. These pilot valves comprise an upper row of signal directing valves labeled V25, V26 and V27, and below them a row of normally open valves V28, V29 and V30. These valves route a composite signal appearing on the line N25, and this signal comes from the regeneration rate control circuit which is about to be described. The three piston actuators A9, A10 and A11 are all normally biased in the closed position, as illustrated at piston actuator A11 of FIG. 1. The application of pressure via one of the control lines N26, N27 or N28 either moves the associated actuator to its fully open position, or serves as an analog signal for modulating the position of the associated valves, V10, V11 or V12, to thereby control the rate of flow therethrough. When header 1 is pressurized, control valve V25 has its slider moved to the left which applies the control signal N25 through the valve V25 through the control line N29, and through the normally open valve V28 into line N26. Thus, the analog signal on line N25 continuously adjusts the position of piston actuator A9, and therefore valve V10 to directly control the pressure drop across the whole system by modulating the rate of main-flow through the adsorption tower T1.

In connection with the second adsorption tower T2, the slider in valve V26 is moved to the right, thereby connecting the source S100 through the line N30, the normally open valve V29 and into the piston actuator A10 to move it to the full open position illustrated. Normally open valve V30 is closed by pressure from the number 1 header and thereby piston actuator A11 closes valve V12 and blocks the admission of gas from pipe P5 to the tower T3 being regenerated.

On the other hand if header 2 is pressurized, valve V28 will be closed, thereby closing valve V10, valve V26 will be moved to the leftmost position, connecting the signal from N25 through N30 and N27 to provide analog control of the position of actuator A10. Valve V27 will be moved to the right, thereby connecting source S100 to piston actuator A11 and opening it fully to permit maximum flow of gas into tower T3 for cooling purposes.

Finally, if header 3 is pressurized, valve V25 will be moved to the right to connect source S100 to piston actuator A9 to pass maximum gas through tower T1 for cooling purposes. Valve V29 will be closed thereby closing tower T2 to the entrance of gas from the main pipeline P5 and valve V27 will be moved to the left thereby passing the signal from source line N25 into piston actuator A11 to provide tower T3 with analog control for purposes of controlling the main-flow.

*Regeneration and rate control circuit*

As stated above, one principal purpose of the invention is to provide control means for measuring the outputs of both the gas heater 14 and the condenser 15 to maintain these temperatures as close to optimum as possible, and this means controlling the rates of flow so as to pass all of the gas through these units which can be passed without sacrificing the proper temperature levels. In order to do this, two temperature controllers X3 and X4 are provided. X3 measures the exit temperature from the condenser 15 and is intended to prevent this temperature from exceeding a predetermined value, for instance 110°, above which some of the desired heavier hydrocarbons would not condense out of the gas stream. The other temperature controller X4 measures the output temperature from the gas heater 14 and prevents it from exceeding a maximum allowable temperature beyond which the adsorption agent within the towers would be damaged. For instance, if silica gel is used as the adsorbent, its temperature should not exceed 600°. A satisfactory silica gel agent is Mobile Sorbead H. There are, of course, other adsorbents such as alumina. An input pressure is provided to the temperature controller X4 in the regeneration rate control circuit from source S20. If the exist temperature is below the dangerous level, a signal is passed from S20 through X4 and line N32, and this passed signal provides the input into temperature controller X3. If the temperature at the exit of the condenser 15 is not above the satisfactory limit, this signal can be passed through the signals X3 and into line N33. The signal then goes to a reversing relay 30 which provides a signal of the opposite sense which is required to operate the valve actuators A9, A10 and A11 and this signal then passes upwardly to valves V25, V26 and V27 via dual check valve arrangement CK6. There is also another signal which is introduced to the line N25 through CK6 from the line N34.

It usually occurs that a maximum allowable pressure drop is assigned by the pipeline operators to a system of the present type. This pressure drop is measured between the inlet pipe P1 and the exit pipe P2 by a differential pressure responsive device 31 which operates a valve V35 which controls pressure from a source S20 and operates a differential pressure controller 32 which is connected to line N34. If the pressure drop across the entire system exceeds the allowed value, a signal is introduced through the line N34 to the line N35 and this signal overrides the control signal entering the line N25 from the reversing relay 30 and controls the flow of gas through line N25 to maintain the pressure drop across the system at or below the maximum preset value.

Since the pressure from the source S20 applied to the temperature controller X4 is applied in series with the controller X3, whichever of these two controllers permits the least pneumatic flow through it comprises the device which is in control of the system at that particular instant. Assuming the particular cycle illustrated in FIG. 1, including main-flow through tower T1, cooling through tower T2 and regeneration through tower T3, if the exit temperature of regenerating adsorption tower T3, as measured by the temperature controller X1, falls below optimum, a signal is sent by way of line N25 into piston actuator A9 to open valve V10 somewhat to reduce the pressure drop propelling the regeneration flow, and thereby raise its exit temperature from the heater going to the tower being regenerated. In this manner the temperature can be raised into the pipeline P18.

On the other hand, the outlet temperature in pipe P16 from whichever of the towers is being cooled is measured by temperature controller X2, and this temperature determines whether or not the exit temperature from the tower being cooled has reached a low enough value that it is a proper time to introduce the main flow gas into tower T2. Moreover, as the output signal from X3 rises, whether actually governed by X3 or X4, the rate of regeneration gas flow must be increased to correct the temperature deviation from set point. An increasing signal level on line N25 to valve V10 would logically result in further opening of valve V10 and less regeneration gas flow if it were not for the presence of the reversing means 30 which causes an increasing signal to close valve V10 as desired. Since the output of X3 ranges from 3 to 15 p.s.i.g., the input to valve V10 when reversed must range from 15 to 3 p.s.i.g.

Figure 3:
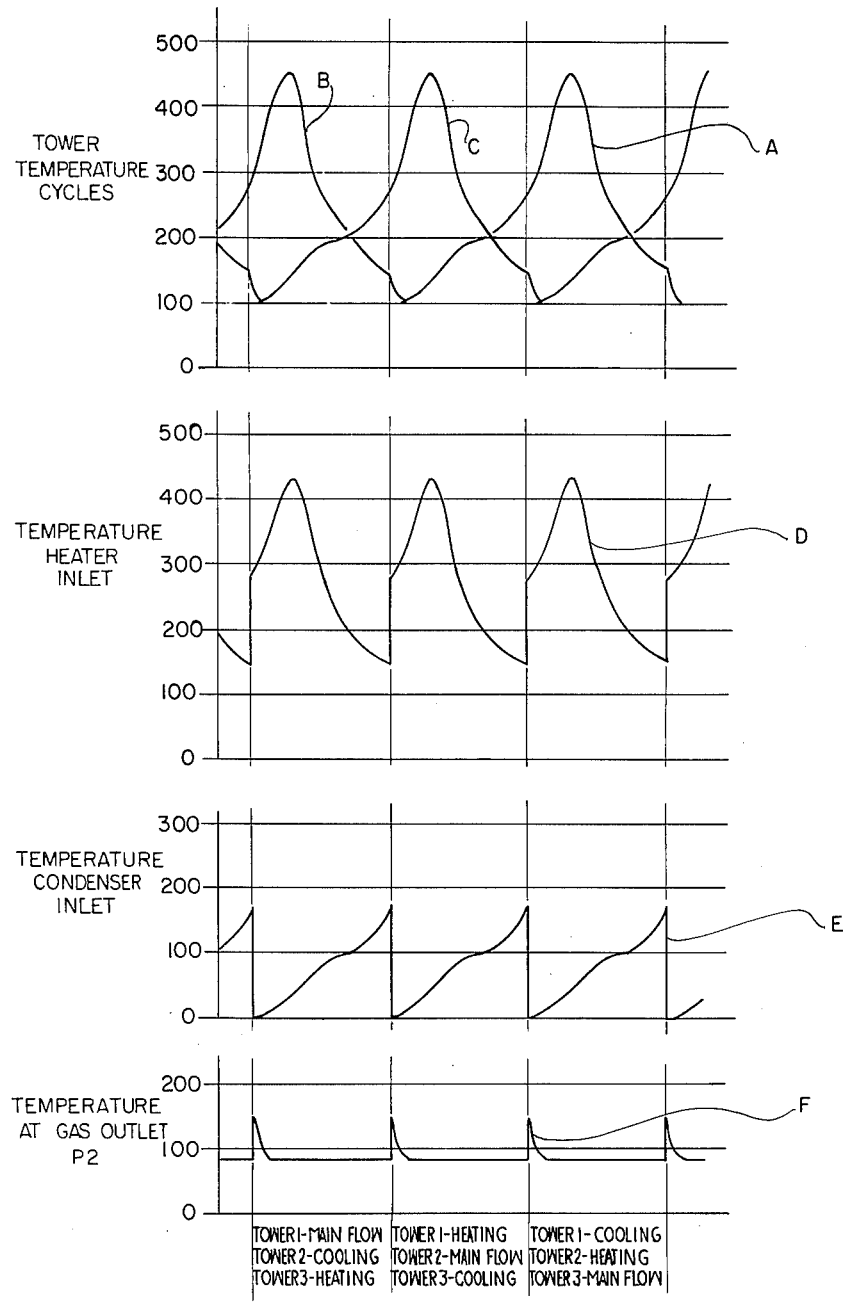
FIG. 3 is a group of related curves graphically representing the operation of a system as illustrated in FIG. 1.

FIG. 3 shows a temperature-time diagram in degrees F. for all three towers. Curves A, B, and C are all superimposed and columnized over legends at the base of the figure stating the functions performed by each tower at each instant of time in one complete cycle. Curve D shows the temperature at the heater inlet for various instants in the 3-tower complete cycle, and curve E shows the inlet temperatures of the condenser for the same instants. Finally, curve F shows the residue gas temperature over the complete cycle.

FIG. 3 clearly shows why a system having a fixed regeneration flow rate cannot afford fast cycling and maximum efficiency. Early in the cycle, curve D, the temperature of the gas going into the heater is substantially higher than it is a little later. The generalized curve shows, for each cycle phase, an initial temperature to the heater of about 280° F. The inlet temperature rises to a 450° F. peak at about 25% of the cycle phase, and then falls over the remaining portion of the phase to about 150°. Another temperature controller X5 measures heater exit temperature and controls diaphram actuator D25 through check valve CK7. Although controller X4 is capable of regulating the flow such that the exit temperature of the heater 14 will not fall below a set point of 600° F., it can place no upper limit on the temperature, which might rise to near 750° F. when X3 or differential pressure device 31 is the governing controller. The adsorbent in the towers must be protected against temperatures much above 600° F. in the usual case. Consequently, when the above condition applies, X5 signals D25 to bypass enough cold gas from pipe P16 to lower the final temperature to the desired level in pipe P18.

In the event a heating cycle phase should be completed before the concurrent cooling cycle phase, all gas can bypass the heater through V36 and the next cooling cycle could be started before the next tower switch, thereby further shortening the process under these circurstances. Thus, time left over in the heating cycle would be applied to shorten the next cooling cycle which was consuming the most time in previous stages of the cycle.

Similarly, as shown by curve E, the loading on the condenser 15 varies throughout the cycle. If a maximum outlet temperature of 100° F. can be tolerated, there obviously is no loading during the first 25% of the phase since the inlet is below the allowable maximum outlet temperature. Also, being air cooled, the cooling capability of the condenser varies considerably day-to-night and season-to-season as air temperatures vary.

All of the pneumatic circuit valves, controllers, differential pressure sensitive means, etc. are standard commercially available components purchased in the open market when the working embodiment set forth herein as an illustrative example was built.

I do not limit my invention to the exact form shown in the drawings, for obviously changes may be made within the scope of the following claims.

I claim:

1. a cyclic adsorption system for removing liquid components from a gas stream, comprising the combination of,
   (a) plural gas adsorption towers,
   (b) gas stream splitting and throttling means for dividing the gas into a throttle-controlled main-flow stream and a split regenerating stream,
   (c) gas heater, condenser and separator means,
   (d) sequential valve means for routing the main-flow through at least one tower performing an adsorption function, and for passing the split-stream through a tower being cooled, through the heater means and into a tower being regenerated, and then through the condenser and separator means,
   (e) intermittent means for controlling the sequence of the valve means to cycle the towers,
   (f) temperature measuring means connected to measure the exit temperatures of the towers being cooled and being regenerated, and connected to actuate said intermittent means when both temperatures have reached preset values, and
   (g) other temperature responsive means connected to the outlets of the heater and condenser means, and coupled to actuate the throttling means to adjust the main-flow stream to maintain the split-stream flow at a rate which will simultaneously maintain the heater temperature above a predetermined minimum and the condenser temperature below a predetermined maximum.

2. In a system as set forth in claim 1, said intermittent means for cycling the functions of the towers comprising
   (a) an input for an actuating signal,
   (b) a source of signal power,
   (c) a power signal storage means for each adsorption tower function,
   (d) an output signal header for each tower function;
   (e) sequence switching means coupled with said source and connected with said storage means and said signal header means, and
   (f) sequence-switching-means actuators connected to be operated by the application of an actuating signal to said input for cycling said sequence switching means to sequentially connect the power source to one signal header and to store a signal in the next sequential storage means, said stored signal being connected to operate the actuators upon receipt of the next actuating signal to discharge said one signal header and energize the next, and said headers being coupled to operate said sequential valve means.

3. In a system as set forth in claim 1, said intermittent means for cycling the function of said towers comprising
   (a) an input for an actuating signal,
   (b) a source of pneumatic pressure,
   (c) a gas storage bottle corresponding with each adsorption tower function,
   (d) a pneumatic signal output header for each adsorption tower function and coupled to operate said sequential valve means,
   (e) a plurality of selector valves coupled with said source and with said signal headers,
   (f) selector valve actuator means,
   (g) and control valves operated by said actuating signal for connecting said storage bottles with said actuator means, and coupled so that when one signal header is pressurized the storage bottle corresponding with the next signal header is pressurized, whereby each time an actuating signal operates said control valves, the pressurized storage bottle operates said actuator means to pressurize its signal header, vent the other signal headers, and pressurize the bottle corresponding with the next header.

4. In a system as set forth in claim 1, said other temperature responsive means comprising
   (a) an actuator connected to modulate said throttling means, and
   (b) a source of power connected with said throttling means through associated temperature measuring means and modulated by both of the latter in cascade.

5. In a system as set forth in claim 1, said other temperature responsive means comprising
   (a) pneumatic pressure actuator means connected to modulate said throttling means,
   (b) a source of pneumatic pressure, associated with temperature measuring means each including pneumatic signal modulating means responsive to measured temperatures, and
   (c) means connecting said modulating means in cascade between said source and said throttling means, whereby the more-nearly closed modulating means assumes control of the throttling means.

6. A cyclic adsorption system for removing liquid components from a gas stream, comprising the combination of
   (a) plural gas adsorption towers,
   (b) gas stream splitting and throttling means for dividing the gas into a throttled-controlled main-flow stream and a split regenerating stream,
   (c) gas separator means,
   (d) sequential valve means for routing the main-flow through at least one tower performing an adsorption function, and for passing the split-stream through towers being cooled and being regenerated, and then through the separator means,
   (e) intermittent means for controlling the sequence of the valve means to cycle the towers,
   (f) temperature measuring means connected to measure the exit temperatures of the towers being cooled and being regenerated and connected to actuate said intermittent means when both temperatures have reached preset values, and
   (g) other temperature responsive means connected with the inlet to the separator means, and coupled to actuate the throttling means to adjust the main-flow stream to maintain the split-stream flow at a rate which will maintain the inlet temperature below a predetermined maximum.

7. In a cyclic sytsem having multiple adsorption towers for removing liquid components from a gas stream and including a gas heater, a condenser connected to discharge into a gas-liquid seaparator, and plural valves for selectively routing the main flow of gas through a regenerlated and cooled adsorption tower while routing gas split from the main stream through a regenerated tower being cooled, into the heater and then into another tower to be regenerated, and finally through the condenser and into the separator to recover said liquid components, improved cycle control means comprising:

(a) cyclic tower switching means for controlling said valves to switch the towers in sequence betwen main-flow, regenerating, and cooling functions in response to spaced initiating signals, (b) first temperature measuring means connected to measure the exit temperture of the tower being regenerated and responsive to the temperature reaching a certain present value, (c) second temperature measuring means connected to measure the exit temperature of the tower being cooled and responsive to this temperature reaching a certain preset value, (d) means connected with both temperature measuring means and operative when both preset values have been reached to deliver a cycle initiating signal to said tower switching means, (e) throttling valve means in the flow system for controlling the proportion of main-stream flow to split-stream flow, (f) third temperature measuring means connected with the outlet of the condenser to measure the temperature of the flow to the separator and responsive to the rise above a predetermined value, (g) fourth temperature measuring means connected with the outlet of the heater to measure the temperature of the flow to the regenerating tower and responsive to the fall of the temperature below a predetermined value, and (h) regeneration-rate control means connected with the third and fourth temperature measuring means and operative when either responds to a temperature beyond its predetermined value to actuate said throttling valve means to reduce the split-stream flow sufficiently to correct that temperature by bringing it within the predetermined value.

8. In a system as set forth in claim 7, differential pressure responsive means connected across the gas flow system and coupled with the regeneration rate control means, said pressure responsive means actuating the throttling valve means to prevent the differential pressure from exceeding a fixed maximum regardless of the measured temperature values.

9. In a system as set forth in claim 7, said cyclic tower switching means comprising:

(a) an input for an initiating signal,
(b) a source of signal power,
(c) a power signal storage means for each adsorption tower function,
(d) an output signal header for each tower function;
(e) sequence switching means coupled with said source and connected with said storage means and said signal header means, and
(f) sequence switching-means actuators connected to be operated by the application of an initiating signal to said input for cycling said sequence switching means to sequentially connect the power source to one signal header and to store a signal in the next sequential storage means, said stored signal being connected to operate the actuators upon receipt of the next initiating signal to discharge said one signal header and energize the next, and said headers being coupled to operate said plural valves.

10. In a system as set forth in claim 7, said cyclic tower switching means comprising:

(a) an input for an initiating signal,
(b) a source of pneumatic pressure,
(c) a gas storage bottle corresponding with each adsorption tower function,
(d) a pneumatic signal output header for each adsorption tower function and coupled to operate said plural tower switching valves,
(e) a plurality of selector valves coupled with said source and with said signal headers,
(f) selector valve actuator means, and
(g) control valves operated by said initiating signal for connecting said storage bottles with said actuator means, and coupled so that when one signal header is pressurized the storage bottle corresponding with the next signal header is pressurized, whereby each time an initiating signal operates said control valves, the pressurized storage bottle operates said actuator means to pressurize its signal header, vent the other signal headers, and pressurize the bottle corresponding with the next header.

11. In a system as set forth in claim 10, said plural routing valves each being controlled by an actuator having multiple inputs connected with said headers, one input at each actuator for opening a valve and another input for closing the valve.

12. In a system as set forth in claim 7, said regeneration rate control means comprising (a) an actuator connected to modulate said throttling valve means, and
(b) a source of power connected with said throttling valve means through said third and fourth temperature measuring means and moduated by both of the latter in cascade.

13. In a system as set forth in claim 7, said regeneration rate control means comprising (a) pneumatic pressure actuator means connected to modulate said throttling valve means,
(b) a source of pneumatic pressure, said third and fourth temperature measuring means each including pneumatic signal modulating means responsive to measured temperatures, and
(c) means connecting said modulating means in cascade between said source and said throttling valve means, whereby the more-nearly closed modulating means assumes control of the throttling valve means.

14. In a cyclic system having multiple adsorption towers for removing liquid components from a main gas stream passing through at least one of the towers and for simultaneously regenerating others of the towers with a split gas stream, the system including plural tower function selecting valves for selectively routing the main gas flow and the split gas flow, and for changing the tower functions upon receipt of an initiating signal, comprising:

(a) an input for an initiating signal,
(b) a source of signal power,
(c) a power signal storage means for each adsorption tower function,
(d) an output signal header for each tower function,
(e) sequence switching means coupled with said source and connected with said storage means and said signal header means, and
(f) sequence switching-means actuators connected to be operated by the application of an initiating signal to said input for cycling said sequence-switching means to sequentially connect the power source to one signal header and to store a signal in the next sequential storage means, said stored signal being connected to operate the actuators upon receipt of the next initiating signal to discharge said one signal header and energize the next, and said headers being coupled to operate said plural valves.

15. In a cyclic system having multiple adsorption towers for removing liquid components from a main gas stream passing through at least one of the towers and for simultaneously regenerating others of the towers with a split gas stream, the system including plural tower function selecting valves for selectively routing the main gas flow and the split gas flow, and for changing the tower functions upon receipt of an initiating signal, comprising:

(a) an input for an initiating signal,
(b) a source of pneumatic pressure, (c) a gas storage bottle corresponding with each adsorption tower function, (d) a pneumatic signal output header for each adsorption function and coupled to operate said plural tower switching valves, (e) a plurality of selector valves coupled with said source and with said signal headers, (f) selector valve actuator means, (g) and control valves operated by said initiating signal for connecting said storage bottles with said actuators, and coupled so that when one signal header is pressurized the storage bottle corresponding with the next signal header is pressurized, whereby each time an initiating signal operates said control valves, the pressurized storage bottle operates said actuator means to pressurize its signal header, vent the other signal headers, and pressurize the bottle corresponding with the next header.

16. In a cyclic system having multiple adsorption towers for removing liquid components from a gas stream and including a gas heater, a condenser connected to discharge into a gas-liquid separator, and plural valves for selectively routing the main flow of gas through a regenerated and cooled adsorption tower while routing the gas split from the main stream through a regenerated tower being cooled, into the heater and then into another tower to be regenerated, and finally through the condenser and into the separator to recover said liquid components, improved cycle control means comprising:

(a) cyclic tower switching means for controlling said valves to switch the towers in sequence between main-flow, regenerating, and cooling functions when the exit temperatures of the towers being respectively regenerated and cooled have reached certain present levels, (b) throttling valve means in the flow system for controlling the proportion of main-stream flow to split-stream flow, (c) temperature measuring means connected with the outlet of the condenser to measure the temperature of the flow to the separator and responsive to the rise above a predetermined value, (d) other temperature measuring means connected with the outlet of the heater to measure the temperature of the flow to the regenerating tower and responsive to the fall of the temperature below a predetermined value, and (e) regeneration-rate control means connected with said temperature measuring means and operative when either responds to a temperature beyond its predetermined value to actuate said throttling valve means to reduce the split-stream flow sufficiently to correct that temperature by bringing it within said predetermined value.

17. In a system as set forth in claim 16, said regeneration rate control means comprising:

(a) an actuator connected to modulate said throttling valve means, and (b) a source of power connected with said throttling valve means through both temperature measuring means and modulated by the latter in cascade.

18. In a system as set forth in claim 16, said regeneration rate control means comprising:

(a) pneumatic pressure actuator means connected to modulate said throttling valve means, (b) a source of pneumatic pressure, said temperature measuring means each including pneumatic signal modulating means responsive to measured temperatures, and (c) means connecting said modulating means in cascade between said source and said throttling valve means, whereby the more-nearly closed modulating means assumes control of the throttling valve means.

References Cited by the Examiner

UNITED STATES PATENTS

| | | | |
|---|---|---|---|
| 2,919,764 | 1/1960 | Dillman et al. | 55—163 |
| 2,995,208 | 8/1961 | Hachmuth et al. | 55—180 X |
| 3,080,692 | 3/1963 | Staley et al. | 55—62 X |

REUBEN FRIEDMAN, *Primary Examiner.*